July 3, 1945.    A. G. SWARTZ ET AL    2,379,666
COIL WINDING MACHINE AND METHOD OF MAKING WIRE COILS
Filed Nov. 2, 1943    5 Sheets-Sheet 1
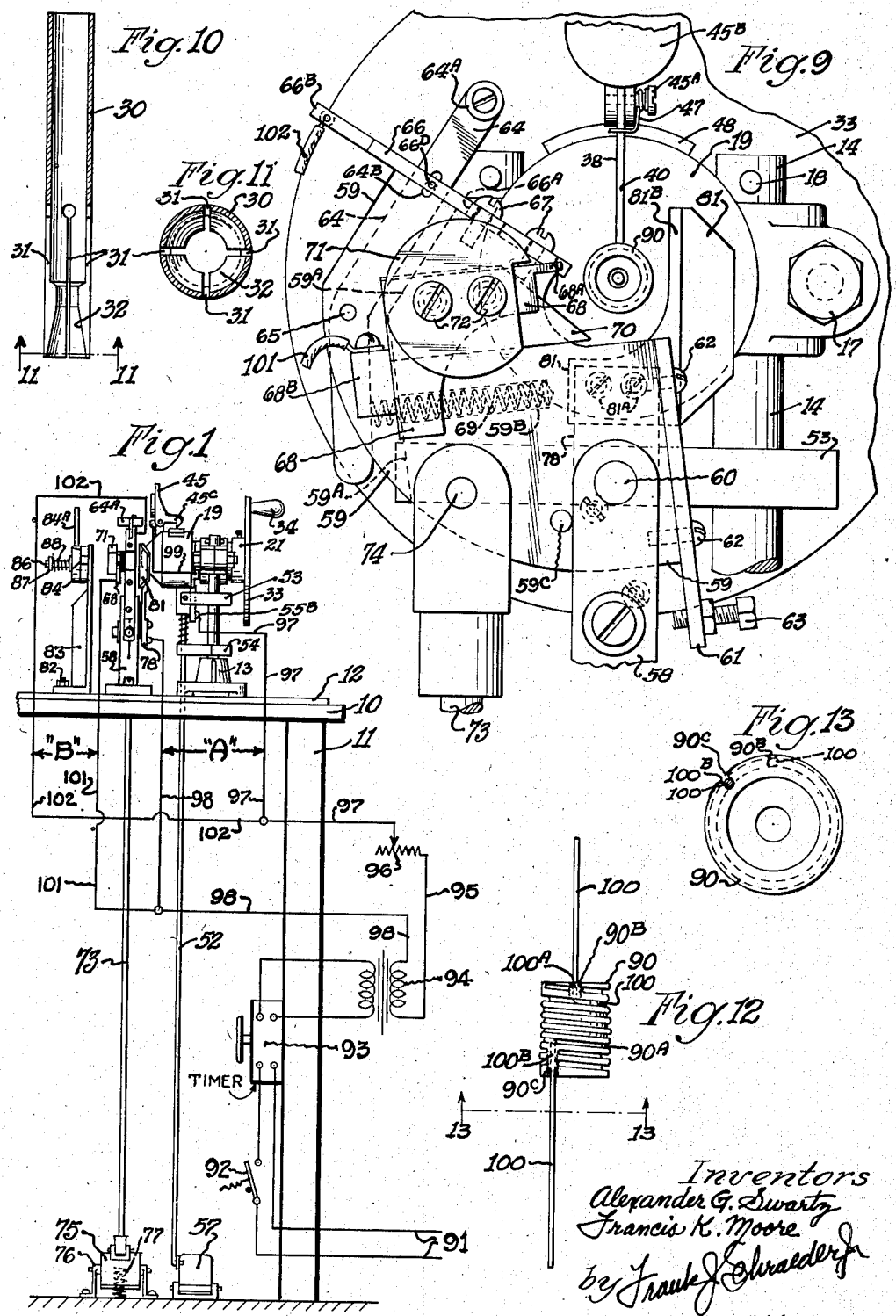
Inventors
Alexander G. Swartz
Francis K. Moore
by Frank J. Schraeder Jr.
Attorney

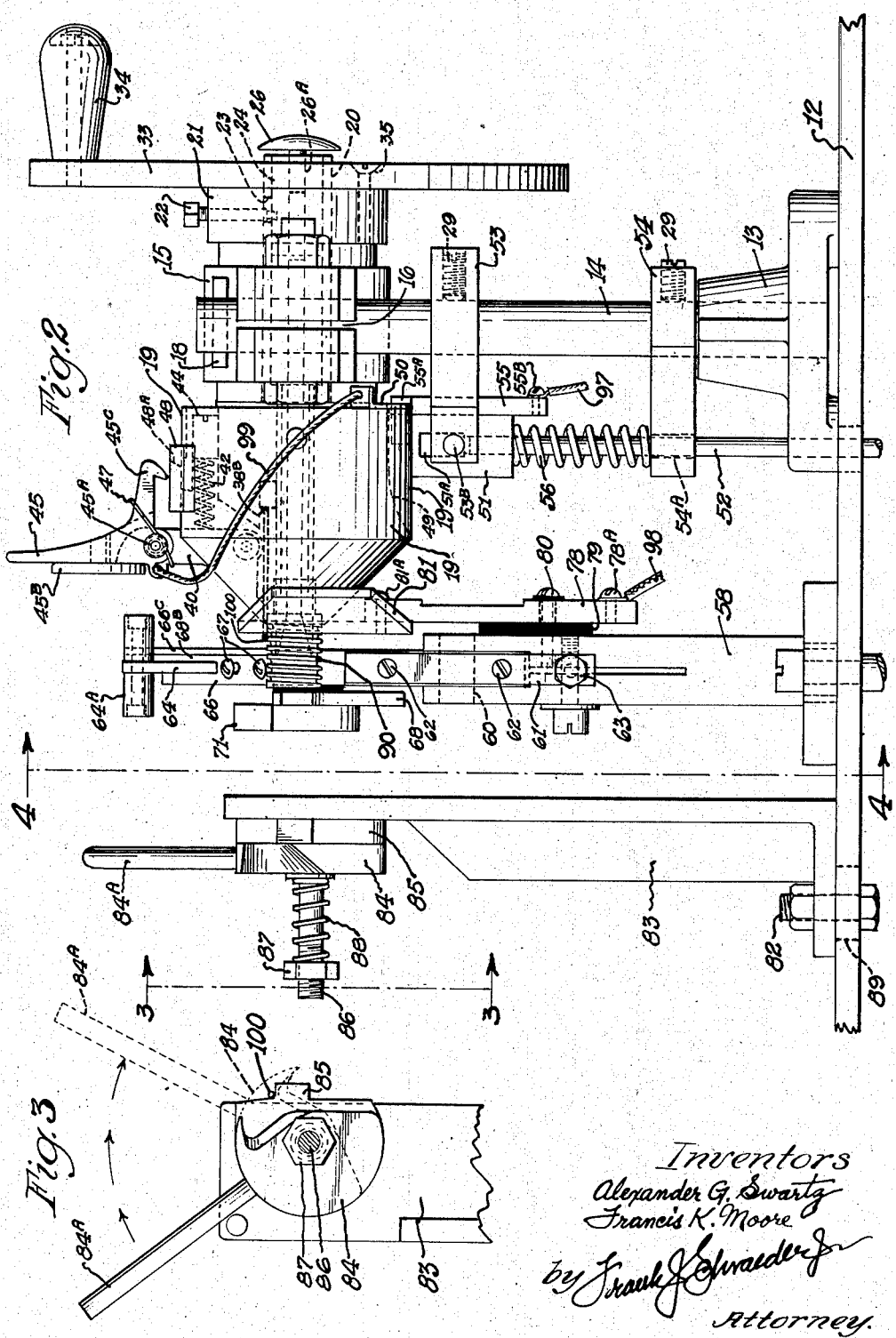

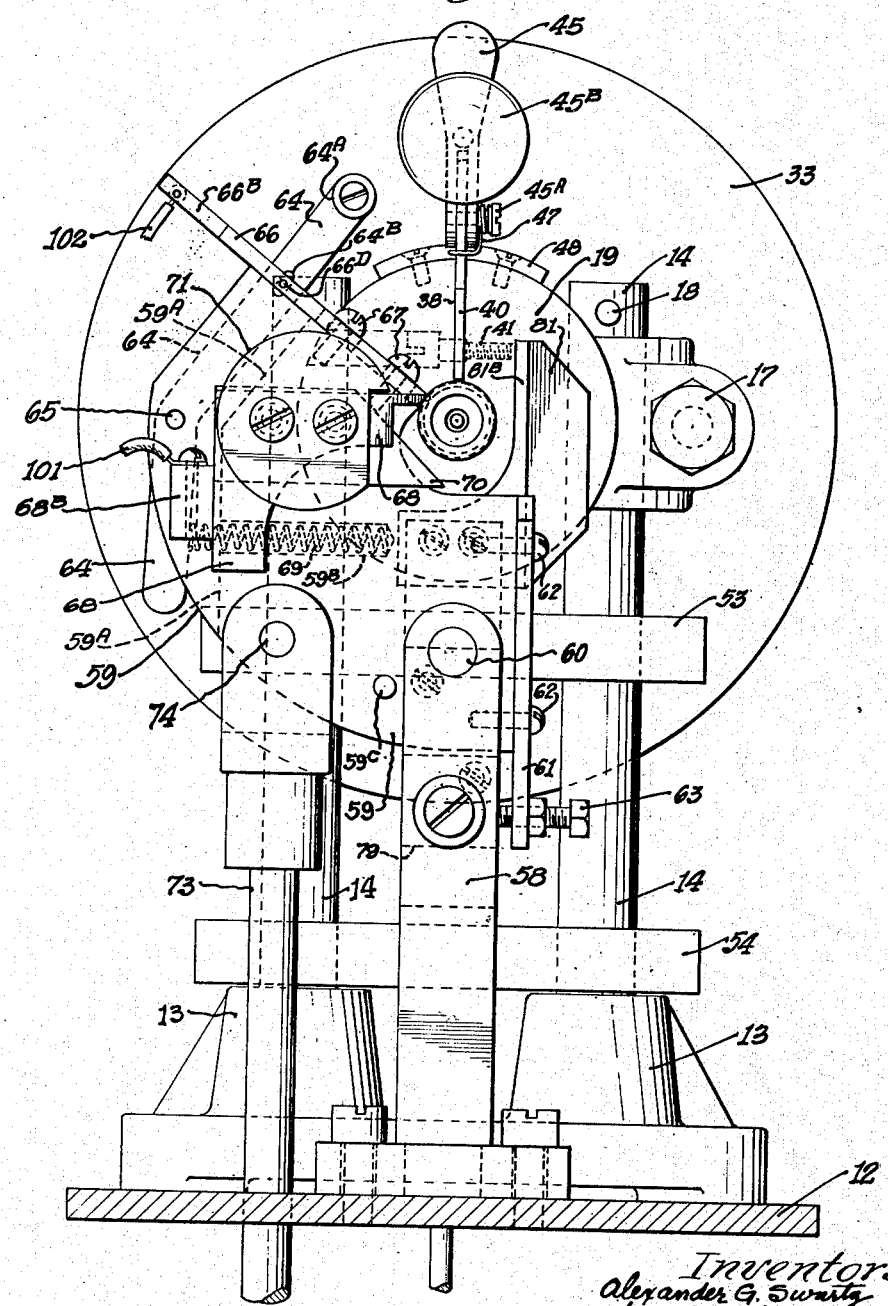

July 3, 1945.

A. G. SWARTZ ET AL 2,379,666

COIL WINDING MACHINE AND METHOD OF MAKING WIRE COILS

Filed Nov. 2, 1943

Inventors
Alexander G. Swartz
Francis K. Moore
by Frank Schraeder
Attorney

July 3, 1945.  A. G. SWARTZ ET AL  2,379,666
COIL WINDING MACHINE AND METHOD OF MAKING WIRE COILS
Filed Nov. 2, 1943  5 Sheets-Sheet 5
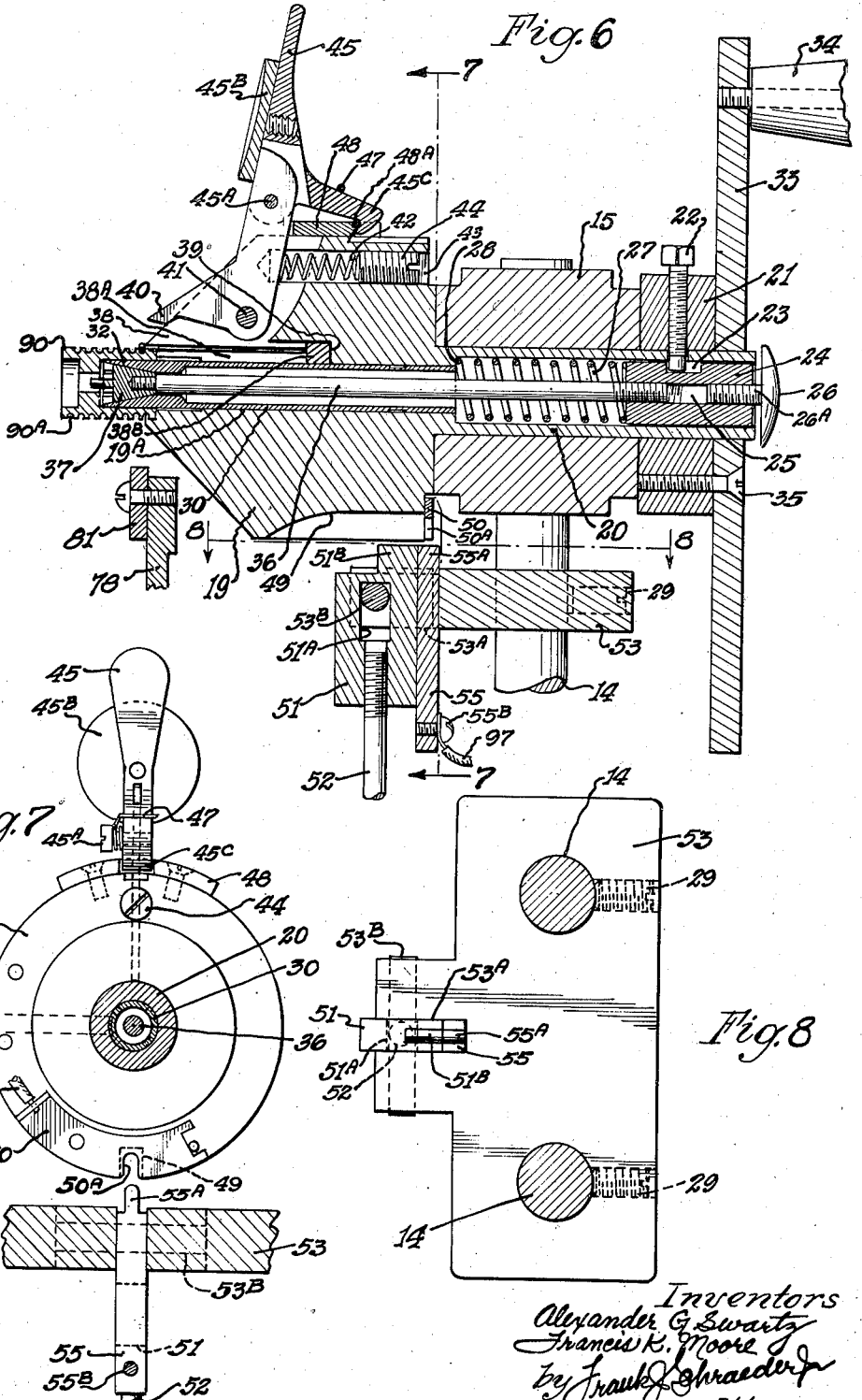
Inventors
Alexander G. Swartz
Francis K. Moore
by Frank Schraeder
Attorney.

Patented July 3, 1945

2,379,666

UNITED STATES PATENT OFFICE 2,379,666

COIL WINDING MACHINE AND METHOD OF MAKING WIRE COILS

Alexander G. Swartz and Francis K. Moore, Chicago, Ill., assignors to Albert Specialty Company, Chicago, Ill., a corporation of Illinois Application November 2, 1943, Serial No. 508,714

16 Claims. (Cl. 242—9)

This invention relates generally to coil winding machines and has particular reference to machines for winding coils employed in electronic devices and various electrical apparatus where an electric conductor wire must be precisely wound upon a core or spool and secured thereto.

An object of the invention is to provide a machine capable of accurately winding an electrical conductor wire around a core, such as a spool, of plastic material, and securing a portion or spaced portions of the wire thereto, as by fusing.

Another object of the invention resides in a novel machine for winding a wire in coil form of a selective number of convolutions around a plastic spool, or any portion thereof, and fusing a portion or spaced portions of the spool to secure a portion or spaced portions of the wire thereto while the wire is electrically heated and retained at such point or points of fusion under slight pressure.

Still another object of the invention is found in the provision of a coil winding machine including means whereby a portion or spaced portions of a wire coiled upon a spool by the machine may readily be secured to a portion or spaced portions of the spool by momentarily fusing such spool portion or portions while slight pressure is applied to the wire portion during the fusing of the spool portion by electrically generated heat through an electrical circuit of which the wire forms a part.

A further object aims at providing a coil winding machine which is adapted to releasably retain a spool, index a predetermined length of a wire and secure same by fusion to one end of the spool, then rotate the spool to provide the necessary convolution or convolutions of wire upon the spool and then secure an extended portion of the wire to the other end of the spool.

A still further object of the invention is found in the novel method of winding coils on spools and securing same thereto.

It is also an object of the invention to provide certain novel features of construction and arrangement of parts tending to enhance the efficiency and utility of machines of the type herein described.

With these and other important objects in view, our invention consists in the novel combination, construction and arrangement of the members and parts shown in preferred embodiment in the attached drawings, described in the following specification and particularly pointed out in the appended claims forming a part thereof.

In the drawings:

Fig. 1 is a front elevation of the machine constructed in accordance with our invention;

Fig. 2 is an enlarged front elevation of the upper part of the machine;

Fig. 3 is a section on the line 3—3 of Fig. 2;

Fig. 4 is a sectional elevation on the line 4—4 of Fig. 2;

Fig. 6 is a section on the line 6—6 of Fig. 5;

Fig. 7 is a section on the line 7—7 of Fig. 6;

Fig. 8 is a section on the line 8—8 of Fig. 6;

Fig. 9 is a view similar to Fig. 4 with parts shown in different position;

Fig. 10 is a detail section of a spool holding member;

Fig. 11 is an enlarged section taken on line 11—11 of Fig. 10;

Fig. 12 is a top plan view of a spool and a wire coiled thereon; and

Fig. 13 is an enlarged section on the line 13—13 of Fig. 12.

Figure 5:
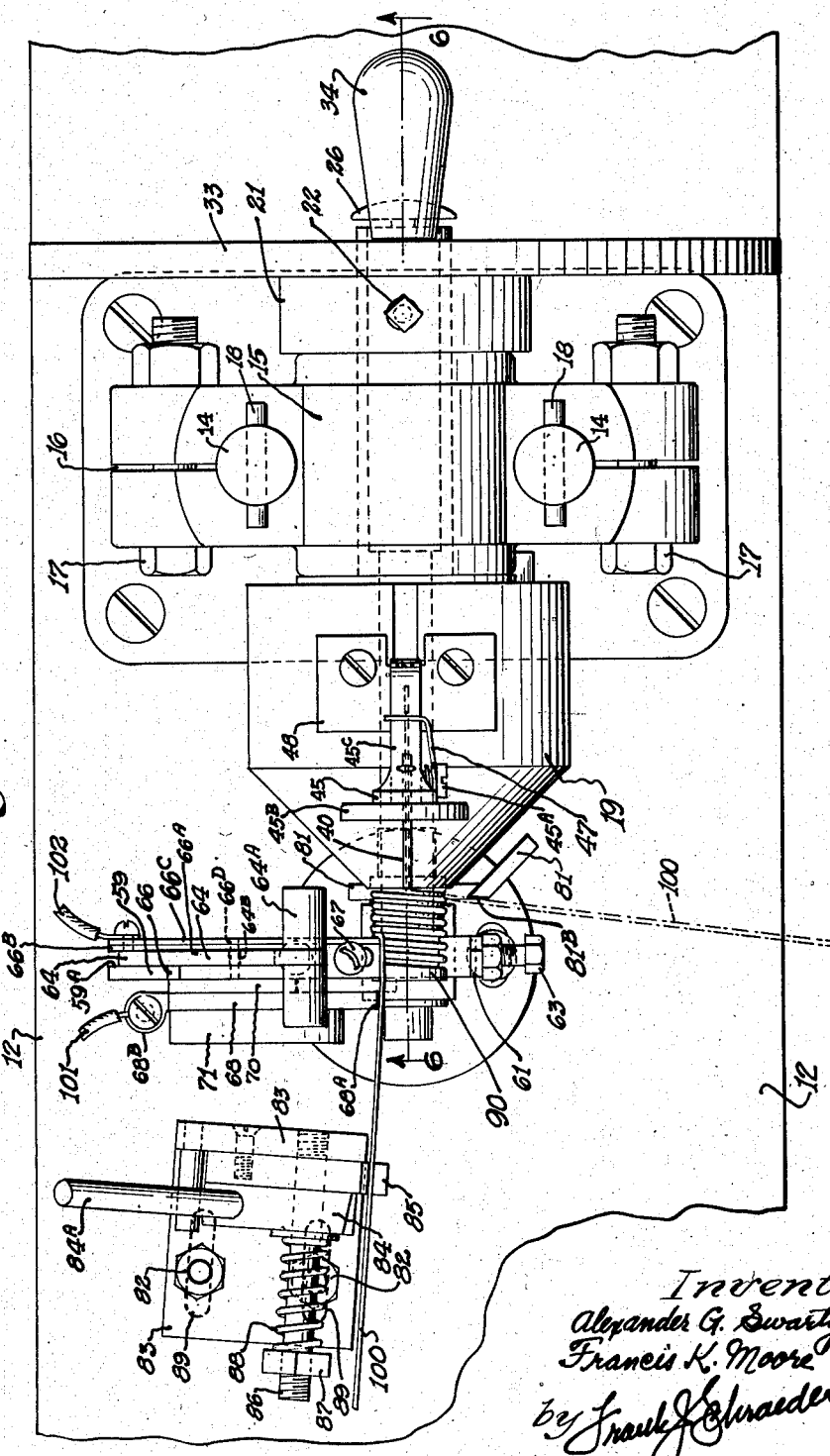
Fig. 5 is a top plan view of the machine.

Referring to the drawings, 10 designates a work bench or table which includes suitable supporting legs such as indicated by numeral 11 (Fig. 1). A base plate 12 mounted on the table 10 is provided with a pair of integral supports 13 for a pair of spaced uprights 14 on which is mounted a bearing 15 the end portions of which are split, as at 16, and encompass the uprights 14. The bearing 15 is rigidly secured to the uprights 14 by bolts 17 which pass through the split ends thereof.

Each upright has a transverse limit pin 18 which pins constitute abutments for the uppermost position of the bearing 15.

Referring to Fig. 6, a head 19 is provided with a rearwardly disposed integral tubular extension 20, of decreased diameter, which is rotatably supported in the bearing 15 and extends beyond the rear end of the bearing 15 to receive thereon, adjacent to the bearing 15, a collar 21 secured to the extension 20 by a screw 22 which passes through the tubular extension 20 into a short longitudinal slot 23 of a cylindrical end piece 24 having a central bore 25. The end piece 24 is slidably supported within the rear end of the head extension 20 and is longitudinally slidable therein a distance limited by the abutment of the ends of the slot 23 with screw 22. A spool-release button 26 is provided with a screw-threaded stem 26A for threaded connection within the end of the bore 25. The button 26 and end piece 24 are normally held in outward position with the inner end of slot 23 in abutment with the screw 22 by the pressure of a coil spring 27 having one end in abutment with the end piece 24 and its opposite end in abutment with a shoulder 28 in the tubular extension 20.

The head 19 is provided with a central bore 19A which is coaxial with the tubular extension 20 to receive therein a spool holding sleeve or tube 30 (Fig. 10) formed at the forward or outer end with a plurality of longitudinal slots 31 to obtain clutching resiliency at such end thereof and preferably having at its outer end progressively inwardly thickened wall portions to provide an inner conical seat 32 for a purpose hereinafter described.

A hand wheel 33 having a handle 34 is mounted adjacent to the collar 21 on the outer end of extension 20 and is secured to the collar 21 by one or more screws 35. A push rod 36 is threaded into the inner end of the bore 25 of the end piece 24 and extends in coaxial relation with and through the sleeve or tube 30 and the extension 20. The outer end of the push rod 36 is threaded for connection with a conical member or wedge 37 positioned within the conical seat 32 and normally under the action of spring 27 exerting a slightly spreading of the split end of the sleeve or tube 30.

The head 19 is formed with the slot 38 disposed inwardly of the conical end thereof above the tube 30 and communicating with a comparatively narrow elongated slot extension 38A ending in a shoulder 39. A fusing contact member 40 is received in the slot 38 and pivotally mounted therein on a pivot pin 41.

A spring 42, seated in a bore 43 of the head 19, abuts at one end with an adjusting screw 44 which is threaded into the rear end of the bore 43.

At its other end, the spring 42 bears against the contact member 40 which has pivotally secured thereto, as at 45A, a retainer 45, preferably provided with a push button 45B, and having a hook-like catch 45C normally urged by spring 47 to engage an undercut edge 48A of a striker plate 48 secured to the top of the head 19 to thus retain the contact member 40 in raised or inoperative position.

It is evident that the contact member 40 under the influence of spring 42 is urged forwardly into operative fusing position, as viewed in Fig. 6, but is held retracted from such position by the engagement of the catch 45C with the striker plate 48.

As shown in Fig. 7, the head 19 is also formed with a bottom slot 49 and is provided with a segmental electrical contact plate 50, preferably of phosphor bronze, secured to the inner end of the enlarged head proper. The contact plate 50 is provided with a slot 50A which registers with the slot 49 in the head 19.

A stop 51 mounted on the upper end of a foot-operated rod 52 is adapted to enter the slot 49 of the head 19 to lock the same against rotation and to retain the head 19 in inoperative position for proper mounting thereon of the plastic spool and during fusing operations.

The uprights 14 have secured thereto by screws 29 guide plates 53 and 54 (Fig. 2) in superposed relation. The stop 51 is guided in a slot 53A and retained against transverse displacement by a pin 53B which extends through a slot 51A in the stop 51. An upper portion of the rod 52 is movable through a vertical opening 54A in the lower guide plate 54. The plates 53 and 54 therefore guide the stop 51 and its connecting rod 52 in their vertical movements.

The stop 51 has secured thereto a brass contact member 55 and the stop 51 and contact member 55 have formed at their upper ends aligned narrow contact ribs, respectively 51B and 55A. A spring 56 (Fig. 2) is interposed between the guide plate 54 and the stop 51 to normally urge the ribs 51B and 55A into the slots 49 and 50A of head 19 to thus lock the head 19 against rotation and to complete a part of the electric circuit between a conductor 97 secured to the contact member 55 and the segmental plate 50 which is connected electrically with the contact member 40 by the conductor 99.

The connecting rod 52 is connected at its lower end to a treadle 57 (Fig. 1) which upon being depressed by the operator's foot releases the head 19 for rotation as will be hereinafter further referred to.

Cooperating with the contact member 40 during its fusing operation upon the spool 90, is an electrical contact support 78 which is insulated from the support 58 by an insulating plate 79 and secured to such support by an insulated screw 80. An angular contact plate 81 is screw-connected to the upper end portion by screws 81A.

The inner pivoted fusing contact member 40 is employed to secure one end portion of the coiled wire 100 to one end of the plastic spool 90 by fusing a portion of the spool about such one end portion of the coil to thus secure it to the spool. Such secured end portion of coil 100 is indicated by numeral 100A in Fig. 12.

The other end portion of the coiled wire or coil 100 is also adapted to be secured by fusing a portion of the spool 90 about such other end portion of the wire, as at 100B (see Fig. 12), by separate independently operable means comprising a vertical support 58, mounted on base plate 12, having a bifurcated upper end to receive therein a contact-carrying plate member 59 of a general segmental shape oscillatably supported on the pivot pin 60 extending into the ends of the bifurcated portion of the support 58.

The contact-carrying plate member 59 is recessed at its rear end to provide an angularly shaped open slot 59A extending vertically in such rear end thereof thence upwardly angularly through the upper angular face of the member 59. The front end of the member 59 is substantially vertically faced to receive thereon a stop plate 61 which is secured to such vertically faced front end by screws 62. The stop plate 61 extends below the member 59 and carries an adjustable stop screw 63 which limits the movement of the member 59, when the latter is moved into proper fusing position, by the engagement of such adjustable screw 63 with the support 58, as shown in Fig. 4.

When the contact-carrying plate member 59 is in its inoperative position, as more clearly shown in Fig. 9, a stop pin 59C projecting from its side engages the support 58 to thus positively limit its movement into such inoperative position. The oscillating movement of the contact-carrying member 59 is attained through a vertical operating rod 73 having its upper end pivotally connected, as by pin 74, to the contact-carrying member 59 and its lower end pivotally connected to a treadle 75 which is supported on a floor pivot 76. The front end of the treadle 75 being retained in normal raised position by a coil spring 77 to thereby normally maintain the rod 73 in lowered position with the contact carrying member 59 in inoperative position as shown in Fig. 9.

On the upper angularly disposed face of the member 59 is mounted a manually operable outer fusing contact member 66 which consists of a flat plate having in its rear portion a central longitudinal slot 66ᴬ and a pair of elongated openings for screws 67. The outer contact plate member 66 is provided with a rearwardly extended portion 66ᴮ for securement thereto of a current conductor and secured to the extended side of the contact member 66, as by silver soldering, is a brass conductor strip 66ᶜ.

Extending through the slot 66ᴬ is an operating arm 64 which is provided with a transversely disposed handle 64ᴬ. The arm 64 is operatively positioned and movable in the slot 59ᴬ about the pivot pin 65 driven into the member 59. The arm 64 is adapted to slidably move the contact member 66, relatively to its supporting member 59, by means of a connection pin 66ᴰ which is mounted in the contact member 66 and which extends transversely of the slot 66ᴬ through an elongated opening 64ᴮ in the arm 64.

In its slidable movement, the contact member 66 is guided and retained on the angular face of its supporting member 59 by means of the screws 67 which extend through elongated openings in the contact member 66 into the pivoted supporting member 59, the screws 67 being tightened only sufficiently to prevent displacement of the contact member from its support 59 but permitting its slidable movement thereon.

Cooperating with the manually operable outer fusing contact member 66 is an electrical copper contact member 68 which is provided with a wire-retaining edge 68ᴬ and an electrical conductor connection ear 68ᴮ. In its inoperative position, the fusing contact member 66 is normally retained slightly moved forwardly with its spool-fusing end projecting slightly beyond the end of the retaining edge 68ᴬ of the contact member 68, as more clearly shown in Fig. 9. This normal forward position of the fusing contact member 66 is attained by a coil spring 69, which is retained in a recess or bore 59ᴮ of the pivoted support 59, and which spring 69 has one end in abutment with the wall at the inner end of the recess 59ᴮ and its opposite end in abutment with the arm 64.

The electrical contact member 68 is electrically spaced from the side of the pivoted supporting member 59 by a suitable flat insulating member 70 having an angularly cut end for forward clearance purposes. The member 68 together with its insulator 70 is secured to the supporting member 59 by a suitable head 71 and a pair of screws 72 extending through insulating sleeves into the supporting member 59.

As above set forth our invention contemplates a machine or device which is capable of winding a coil of wire around a spool or core 90 of electrically non-conductive material, preferably a fusable plastic material, and securing the coil to its supporting core, such spool or core preferably being provided with a helical or spiral groove or thread 90ᴬ of one or more more convolutions. Our invention also contemplates a machine and method of producing core-supported wire coils having free ends of predetermined lengths extending beyond the ends of the core, the machine having adjustable means for controlling the production of such coils with the desired lengths of such extended initial and final ends of the coil. We prefer to feed the wire to the machine from a spool of stock wire and cut the final end of the wire by an adjustable cutter after the coil has been wound upon its core, such cutter being movably adjustable relatively to the coil-winding head to thereby selectively vary the length of the extended free end of the wire at the finished end of the coil, the length of the other extended initial end of the wire being variable by varying the depth of the slot 38ᴬ into which the free initial end of the wire is adapted to be inserted, such variation in slot depth being attainable as by interchangeable inserts 38ᴮ of different lengths. It is obvious that the desired number of convolutions of the wire may be readily obtained through the desired number of manual rotations of the head 19. An accurate part of the final one convolution may be attained by the provision of one or more slots 49 and 50ᴬ provided in the head 19 and plate 50 for the stop 51 and circumferentially accurately arranged relatively to the fusing contact member 66. The accurate length of the final partial convolution of the wire coil may also be varied in several machines each differing in the angle between the fusing contacts 40 and 66.

After the desired coil has been wound upon and secured to its core by fusing, the desired length of the final free end of the wire is secured by an adjustable cutter comprising an angle iron support 83 on which is pivotally mounted a cutter 84 operated by a handle 84ᴬ adapted to cut the final end of the wire to proper length in cooperation with a stationary wire support 85. The wire cutter 84 and the stationary support 85 are mounted on a horizontal pin 86 which is threaded to receive an adjustable nut 87 between which nut and the cutter 84 a coil spring 88 is inserted to hold the cutter in face abutment with the wire support 85.

To permit adjustment of the cutter to secure the desired length of the final extended free end of the wire, the supporting base plate 12 is provided with a slotted opening 89 for the bolt 82 which secures the cutter-supporting angle 83 and the cutter 84 in the desired stationary position relatively to the fusing contact 66.

The fusing of spaced portions of the core or spool 90 to thereby secure the spaced portions of the coil 100 thereto is attained by electrical means including an electrical circuit comprising the current source of supply conductors 91 which are connected to a primary coil of a transformer 94 through an interposed normally open switch 92 and an adjustable automatic timer 93.

The adjustable intervalometer or timer 93 is adapted to be adjusted to maintain the circuit in closed condition for selected period of time and then automatically break the circuit. The transformer 94 functions to drop the voltage of the current to the desired amount for proper fusing operation, as for example, from 220 volts to .5 volt.

One end of the secondary coil of the transformer 94 is connected by a conductor 95 to one end of an adjustable resistance 96 the other end of which resistance is connected to one end of the conductor 97. The other end of the secondary coil of the transformer 94 is connected to one end of the conductor 98.

The conductor 97 is electrically connected by contact screw 55ᴮ to the lower end of the brass contact member 55 of the stop 51. When the stop 51 is in operative position to retain the head 19 against rotation, the current may flow from the conductor 97 and contact member 55 to the fusing contact 40 through a bridge conductor 99 which is electrically connected at one end with the segmental plate 50 and at its other end with the metallic retainer 45 for the fusing contact 40.

The conductor 98 is electrically connected by contact screw 78ᴬ to the lower end of the electrically conductive support 78 for the electrically conductive contact plate 81.

The fusing contact 40 is adapted to be moved into fusing position by the manually operable retainer 45 to exert a slight pressure upon the wire 100 to thereafter secure the wire to one end of the spool, as at 100A in Fig. 12.

After the free end of the wire 100 has been inserted into the slot 38A into abutment with the shoulder 39 (or with an insert 38B) to thus predetermine the exact length of the wire which it is desired shall extend from one end of the spool, and after the fusing contact 40 has been moved into operative fusing position over the portion of the wire which extends through a small index slot 90B at the end of the spool 90, the fusing contact 40 is then in position to cause a fusing of the portion of the spool under the contact 40 about the portion of the wire beneath the fusing face of the contact 40. Following the positioning of the contact 40 into fusing position, the wire portion which extends beyond the contact 40 is manually swung counter-clockwise, as viewed in Fig. 5, to bend the wire at the contact 40 angularly to substantially the angle of the helical groove in the spool 90. In such manual movement of the wire 100 it is brought into contact engagement with the angular face 81B of the angular contact plate 81 and such contact engagement positions the portion of the wire 100 which extends between the contact 40 and the contact plate 81 at the desired angle to facilitate its winding into the spool groove and also closes that portion of the electrical circuit A between the two contacts 40 and 81.

Having closed that part of the circuit A between the contacts 40 and 81, the circuit A may then be completely closed by the closing of the switch 92, as by the operator's right knee since the switch 92 is adapted to be mounted at about the elevation of the operator's knee when in seated position before the machine.

The complete final closing of the circuit A causes an automatic operation of the intervalometer 93 to thereby automatically open the circuit after a momentary heating of the portion of the wire under contact 40 to thus cause that portion of the wire to be pressed partially into the spool 90 under a fusion of the portion of the spool thereat partially about such portion of the wire under contact 40 to thereby secure such wire portion to the spool 90, as at 100A.

After such securement of the wire at 100A, the treadle 57 is depressed by the operator's right foot to cause a withdrawal of the stop 51 from its locking position with the head 19 whereupon the rotation of the head 19 by the handle 34 will cause a winding of the wire 100 upon the core or spool 90 while the wire is passed against the guiding face 81B. The hand-wheel 33 is turned the desired number of revolutions to wind the desired number of convolutions of wire upon the spool. In the present instance, the winding of the coil illustrated in Fig. 12, would require four revolutions of the hand-wheel 33 to produce the illustrated coil of almost four convolutions.

After the coiled portion of the wire coil has been wound upon the spool, the treadle 57 is released to lock the head 19 against rotation whereupon the final end portion of the coil is ready for securement to the spool by a fusing operation by means of the manually operable contact member generally designated by numeral 66 within the circuit B.

The circuit B consists of a conductor 101, one end of which is connected with conductor 98 and the other end to the connection ear 68B of the contact member 68, and a conductor 102, one end of which is connected to conductor 97 and the other end to the rearwardly extended portion 66B and the brass conductor strip 66C of the outer or final fusing contact member 66. It will be observed that this circuit B is normally maintained open, or in inoperative condition, by the normally open switch 92 and the gap between the contact member 68 and the elements 66B and 66C of the manually movable fusing contact member 66; the contact member 68 and the fusing contact member 66 being separated and electrically insulated one from the other by the insulating member 70.

Upon the completion of the winding of the coiled portion of the wire upon the spool, the head 19 is, as above stated, locked against rotation by the release of the treadle 57 to permit the spring 56 to move the stop 51 into the slot 49 of the head 19 and immediately after the head 19 is locked, the treadle 75 is depressed, against the pressure of its spring 77, to thereby cause an upward movement of the rod 73 and a forward tilting of the contact-carrying plate member 59 to thus move the spaced contact members 68 and 66 forwardly into operative engagement with the side of the spool 90 while the wire is bent at and held under the lower edge of contact 66 with the outwardly extending portion of the wire in contact with the contact member 68 to thereby bridge and close the gap in the circuit B between the contacts 66 and 68. Upon the closing of switch 92, by slight pressure of the operator's knee, the wire is momentarily heated and that portion of the wire under the spring-pressed contact 66 is slightly pressed into the partially fused portion of the spool to partially embed and secure such portion of the wire to the spool. The momentary heating of the wire is in such instance again automatically controlled and limited to the desired period of fusing of the portion of the spool at the contact 66 for the desired securement of such portion of the wire, as designated by 100B, by the automatic timer 93.

Immediately upon the completion of the securement of the wire, as at 100B, the switch 92 and treadle are released while the portion of the wire extending beyond the spool 90 is brought to rest upon the cutter support 85. A forward movement of the handle 84A will rotate the cutter 84 to sever the wire. The cutter, being adjustable as above pointed out, severs the wire at the desired point to provide the desired length of wire extending beyond the spool-secured end 100B.

The winding of the coil and its securement to the spool having been completed, the spool-supported coil may then be readily removed from the coil-winding head 19 by a movement of the contact 40 and its retainer 45 into raised position with the catch 45C in engagement with the undercut edge 48A of the plate 48 to thus retain the contact 40 in raised position whereupon the spool-supported coil may be slidably removed from the spool-holding sleeve or clutch 30 by an inward movement of the button 26 to thus move the rod 36 and the conical wedge member 37 outward to permit the slotted or split end of clutch tube to spring into normal position to release its frictional engagement with the inner face of the spool 90.

While we have illustrated and described herein preferred constructions and arrangement of parts and members of a coil winding machine in which the principles of the present invention have been embodied, it is to be understood that our invention is not to be construed as being limited to the specific details shown and described herein for various modifications may occur to those skilled in the art to which this invention appertains without departing from the spirit of our invention defined in the appended claims.

We claim:

1. The method of coiling wire upon a plastic spool and securing the coiled wire to the spool by fusion, including the steps of rotating the spool to coil the wire upon the spool, engaging and retaining a portion of the wire while applying slight pressure to the retained portion of the wire, and closing an electric circuit through said wire to partially embed said retained portion of the wire in the spool by fusion of a portion of the spool thereat.

2. The method of coiling wire upon a plastic spool and securing the coiled wire thereto by fusion, including the steps of holding a portion of the wire in contact with the spool while slight pressure is applied against said wire portion, closing an electric circuit through said wire to embed the spool-contacted portion of the wire in the spool by fusion of the portion of the spool contacted by said wire portion, and revolving the spool to obtain a wire coil thereon.

3. The method of coiling wire upon a plastic spool and securing spaced portions of the coil to the spool, including the steps of securing a portion of the wire to one end of the plastic spool by fusion of the portion of the spool in contact with said wire portion, bending the wire into coiling position, rotating the spool to obtain convolutions of the wire thereon, and securing the wire at the end of the convolutions to the spool by fusion of a portion of the spool at the end of said convolutions.

4. The method of coiling wire upon a plastic spool and securing spaced portions of the coil to the spool, including the steps of holding a portion of the wire in contact with and at one end portion of the spool while slight pressure is applied to said wire portion, closing a circuit through said wire to secure said wire portion to the spool by fusion of the contacted part of the spool, rotating the spool to obtain convolutions of the wire thereon, holding a portion of the wire at the end of the convolutions in contact with the spool while slight pressure is applied thereto, and again closing a circuit through said wire to fuse a portion of the spool at the end of the convolutions to thereby secure said wire portion at the end of the convolutions to the spool.

5. The method of coiling wire upon a plastic spool and securing spaced portions of the coil to the spool, including the steps of indexing the wire to extend longitudinally beyond one end of the spool, pressing a portion of the wire into contact with said one end of the spool, securing said wire portion to said contacted end of the spool by fusing a portion of the spool thereat, bending the wire at an angle at such secured portion, rotating the spool to form wire convolutions thereon, fusing a portion of the spool at the end of the convolutions to secure the wire thereat, and cutting off the wire at a predetermined length beyond the end of said convolutions.

6. The method of coiling wire upon a plastic core having a helical groove and securing spaced portions of the coil to the core, including the steps of holding a portion of the wire in contact with said core while slight pressure is applied to said wire portion, closing an electric circuit through said wire to cause said pressed wire portion to become slightly embedded in a fused portion of the core thereat, bending the wire at such secured portion to an angle substantially equal to the angle of said helical groove, rotating the core to obtain convolutions of the wire within said helical groove, applying pressure to and holding a portion of the wire at the end of said convolutions against said core, closing an electric circuit through said wire to cause said pressed wire portion at the end of said convolutions to become slightly embedded in a fused portion of the core thereat, and cutting the wire after said second mentioned portion of the wire is secured to said core.

7. A machine for coiling wire upon a plastic spool, including a holder for releasably securing said spool in position, means for indexing the wire over said spool, means for securing a portion of the wire to one end of said spool by fusion, and means for imparting rotation to said holder to rotate the spool and thereby cause a winding of the wire upon said spool.

8. A machine for coiling wire upon a plastic spool, including a holder for releasably securing said spool in position, means for indexing the wire over said spool, electrical means adapted to momentarily heat a portion of the wire to secure same to said spool by fusion of a portion of said spool in contact with said heated wire portion, and means for imparting rotation to said spool to cause a winding of convolutions of the wire upon said spool.

9. A machine for coiling wire upon a plastic spool, including a holder for releasably securing said spool in position, means for indexing an end portion of the wire over said spool, a spring-pressed contact adapted to engage and press a portion of the wire against the spool, a circuit adapted to be closed through said wire for securing the contact-engaged portion of said wire to one end portion of said spool by the fusion of a portion of said spool at said contact-engaged portion of the wire, and means for imparting rotation to said spool to cause a winding of said wire upon said spool.

10. A machine for coiling wire upon a plastic spool, including a holder for releasably securing said spool in position; means for indexing the wire over said spool, electrical contact means for retaining a portion of the wire in pressure-contact with said spool, a circuit of which the wire is a part adapted to be closed through said wire to secure said portion of said wire to said spool by fusion of a portion of said spool thereat, and means for imparting rotation to said spool to cause a winding of said wire upon said spool.

11. A machine for coiling wire upon a plastic spool, including a rotatable holder for releasably securing said spool in position, releasable retaining means for normally retaining said holder against rotation, electrical means for securing a portion of said wire to one end of said spool by fusion of a portion of the spool adjacent said wire portion, means for releasing said retaining means, means for imparting rotation to said spool to cause a winding of said wire upon said spool, and electrical means for securing a portion of said wire at the end of said winding to said spool by fusion of a portion of the spool thereat.

12. A machine for coiling wire upon a plastic spool, including a rotatable holder for releasably securing said spool in position, means for indexing an end portion of the wire to said spool, spring-pressed electrical contact means for retaining a portion of said wire in contact with said spool, a circuit adapted to be closed by said electrical contact means and said wire to secure said wire portion to one end of said spool by a fusion of a portion of said spool thereat, and means for imparting rotation to said spool to cause a winding of the wire upon said spool.

13. A machine for winding a wire in coil form upon a plastic spool and securing the coil thereto, including a rotatable holder for releasably retaining said spool thereon, releasable locking means for normally locking said holder against rotation, means for releasing said locking means, means for imparting rotation to said holder and spool to cause a winding of the wire in coil form upon said spool, and electrical means for securing the wire coil to said plastic spool by fusion of a portion of said spool through a circuit of which said wire forms a part.

14. A machine for winding a wire in coil form upon a plastic spool and securing spaced portions of the coil to the spool, including a rotatable holder for releasably retaining said spool thereon, releasable locking means for normally locking said holder against rotation, electrical means adapted to engage and yieldingly retain a portion of the wire retained in pressed contact with a portion of the spool including a circuit of which said wire is a part, means for closing said circuit to thereby momentarily heat and secure said yieldingly retained portion of the wire by fusion of a portion of said spool thereat, means for releasing said locking means, means for imparting rotation to said spool to cause a winding of the wire in coil form upon said spool, additional electrical means adapted to engage and yieldingly retain a portion of the wire at the end of the convolutions, and an additional circuit of which said wire forms a part, means for closing said additional circuit to thereby momentarily heat and secure said yieldingly retained portion of the wire retained in pressed contact at the end of the convolutions by fusion of a portion of said spool at the end of said convolutions to thereby secure the wire coil to the spool.

15. In a coil winding machine adapted to wind a wire in coil form upon a plastic core and secure the coil to the core comprising, in combination, a rotatable holder adapted to releasably retain the core thereon, means for rotating said holder and said core to cause a winding of the wire upon said core in coil form, and electrically connected means for securing the coil of wire to said core by fusion comprising an electrical circuit including a switch, an adjustable automatically operable intervalometer, a transformer, an adjustable resistance, a stationary contact, and a movable spring-pressed contact, said spring pressed contact being adapted to be moved into pressure-exerting engagement with a portion of the coil on said core while a portion of the wire stock is held in contact with said stationary contact, and said switch being operable to close the circuit through said contacts and the wire stock extending between said contacts to thereby momentarily heat the portion of the wire engaged by said movable spring-pressed contact to cause a fusion of the portion of the core at such contact-engaged portion of the coil to thereby secure such coil portion to the core, said momentary period of heating of the wire being automatically controlled by said intervalometer which is adapted to automatically open the circuit after the circuit is closed by said switch.

16. In a coil winding machine adapted to wind a wire in coil form upon a plastic core and secure spaced portions of the coil to the core comprising, in combination, a rotatable holder adapted to releasably retain the core thereon; electrically connected means for securing spaced portions of the coil to the core by fusion comprising an electrical circuit including a switch adapted to operatively close the circuit, an adjustable automatically operable intervalometer adapted to automatically open the circuit within a relatively short period of time after the circuit is closed by said switch, an adjustable transformer adapted to control the voltage of the circuit, an adjustable resistance adapted to control the amperage of the circuit, a pair of spaced movable contacts adapted to be successively moved into position to yieldingly exert pressure upon spaced portions of said coil against said core, one of said movable contacts being mounted on and movable relatively to said rotatable holder and the other of said movable contacts being mounted upon a stationary support, and a pair of stationary contacts, one of said stationary contacts being arranged to electrically cooperate with said movable contact on said holder and the other one of said stationary controls being arranged to electrically cooperate with the other one of said movable contacts; said movable contact on said holder being adapted to be moved into yielding engagement with a portion of the wire disposed at one end of said core while a portion of the wire stock is held in contact with one of said stationary contacts, said switch being operable to close the circuit through said holder-mounted movable contact and its electrically cooperative stationary contact and through that portion of the wire stock connecting such contacts to thereby momentarily heat the portion of the wire engaged by said holder-mounted movable contact to cause a fusion of said one end of the core at such holder-mounted contact to thereby secure such wire portion to the core, said holder and core being thereafter rotatable to cause a winding of one or more convolutions of the wire upon said core in coil form, said other movable contact being adapted to be moved into yielding engagement with a portion of the wire extending at the other end of the core while a portion of the wire stock is held in contact with the other one of said stationary contacts, and said switch being again operable to close the circuit through said other movable contact and its electrically cooperative stationary contact and through that portion of the wire stock connecting such contacts to thereby momentarily heat the portion of the wire engaged by said other movable contact to cause a fusion of a portion of the core adjacent thereto to thereby secure the coil to said other end of the core.

ALEXANDER G. SWARTZ.
FRANCIS K. MOORE.